(12) United States Patent
Ben-Maimon

(10) Patent No.: US 7,478,710 B2
(45) Date of Patent: Jan. 20, 2009

(54) VACUUM PUMP VIBRATION ISOLATOR

(76) Inventor: Rami Ben-Maimon, 31 Bernstein Street, 75503 Rishon Lezion (IL)

( * ) Notice: Subject to any disclaimer, the term of this patent is extended or adjusted under 35 U.S.C. 154(b) by 244 days.

(21) Appl. No.: 11/125,387

(22) Filed: May 9, 2005

(65) Prior Publication Data
US 2005/0248072 A1   Nov. 10, 2005

(30) Foreign Application Priority Data
May 10, 2004  (IL) ..................................... 161900

(51) Int. Cl.
*F16M 13/00* (2006.01)
(52) U.S. Cl. .................. 188/379; 248/562; 417/313
(58) Field of Classification Search .................. 303/10, 303/11; 417/363, 423.4; 92/98 R; 188/379–380
See application file for complete search history.

(56) References Cited

U.S. PATENT DOCUMENTS

| | | | |
|---|---|---|---|
| 4,352,643 A * | 10/1982 | Iijima | 417/313 |
| 5,366,048 A | 11/1994 | Watanabe et al. | |
| 5,864,273 A | 1/1999 | Dean et al. | |
| 5,931,441 A | 8/1999 | Sakamoto | |
| 6,323,494 B1 | 11/2001 | Leo | |
| 6,814,550 B1 * | 11/2004 | Adamietz et al. | 417/363 |
| 6,867,521 B2 | 3/2005 | Beyer et al. | |
| 7,059,828 B2 * | 6/2006 | Conrad et al. | 415/170.1 |
| 7,095,482 B2 * | 8/2006 | Phillips et al. | 355/53 |
| 2005/0013703 A1 * | 1/2005 | Cafri et al. | 417/363 |
| 2005/0106043 A1 * | 5/2005 | Casaro et al. | 417/363 |
| 2005/0204754 A1 * | 9/2005 | Vuillermoz | 62/55.5 |
| 2008/0085202 A1 * | 4/2008 | Namiki et al. | 417/540 |

FOREIGN PATENT DOCUMENTS

| | | |
|---|---|---|
| JP | 6167414 | 6/1994 |
| JP | 2002295372 | 10/2002 |

* cited by examiner

*Primary Examiner*—Christopher P Schwartz
(74) *Attorney, Agent, or Firm*—Deborah A. Gador

(57) ABSTRACT

A damper mechanism for isolating vibrations from a vacuum pump constructed and adapted for coupling to a vacuum chamber, the damper mechanism including an elastomeric material, preferably an elastomer diaphragm, coupled between the pump and the vacuum chamber so as to permit the pump to move in six degrees of freedom, while transferring minimum force to the chamber.

11 Claims, 6 Drawing Sheets

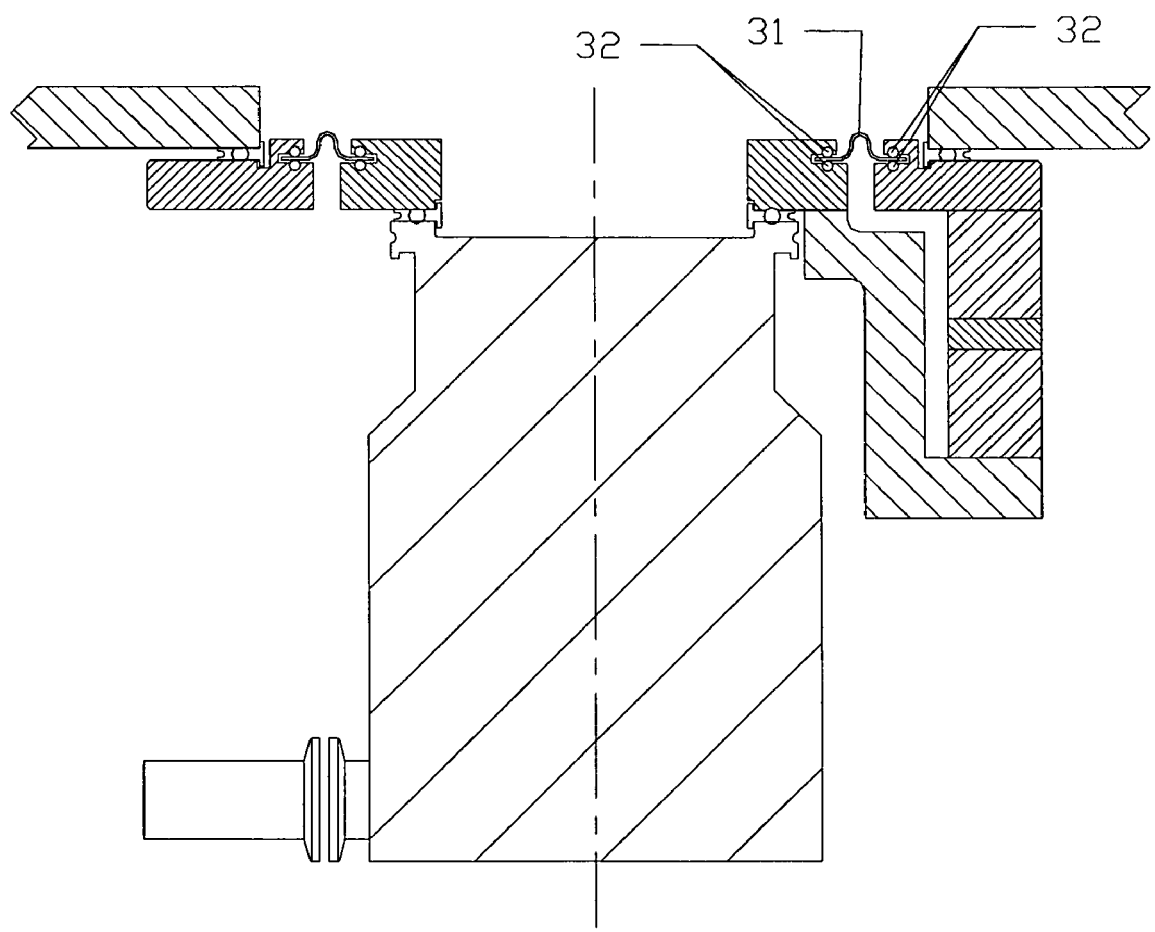

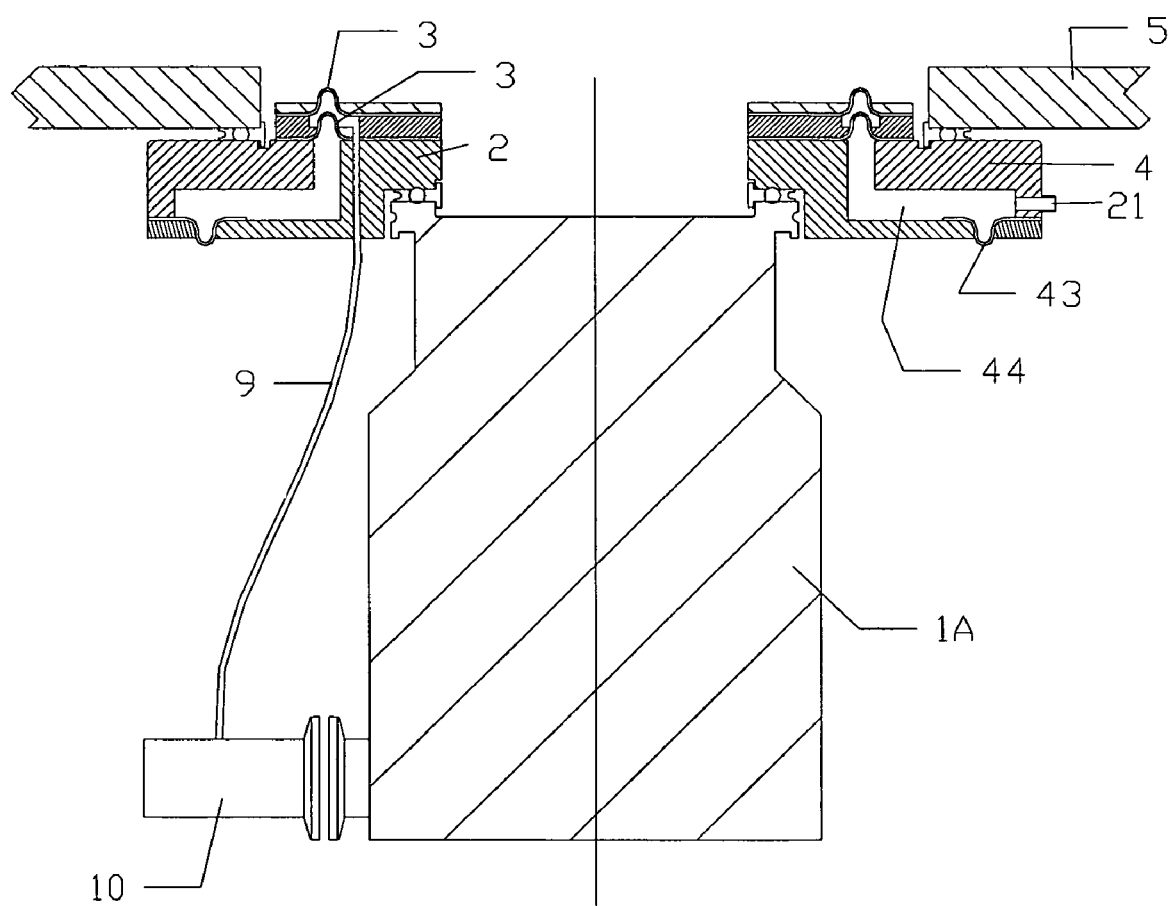

VACUUM PUMP VIBRATION ISOLATOR

FIELD OF THE INVENTION

The present invention relates to vibration isolation of high vacuum pumps, in general, and in particular, to devices for isolating vibrations of turbo pumps from vacuum chambers.

BACKGROUND OF THE INVENTION

Turbo pumps are used to provide deep vacuum in sensitive inspection machines, such as scanning electron microscopes. As the pumps rotate, they produce vibrations which can prevent proper operation of the inspection machines. Accordingly, it is desired to provide vibration isolation of the pump from the vacuum chamber to which it is connected. In conventional systems, dampers are connected between the pump, which rotates at high speed, and the vacuum chamber. The purpose of these dampers is to isolate the sensitive equipment from the vibration of the pumps.

One example of a known damper is shown in FIG. 1. A pump (1A) is connected to a vacuum chamber (not shown) by a sealing mechanism. The sealing mechanism consists of a metal bellow (2A), which connects the pump (1A) and the vacuum chamber, and a damper (3A) which is built around the bellow. Damper (3A) is usually a rubber or elastomer ring that fits around the metal bellow.

While this damper is able to absorb a large percentage of the vibrations from the pump, the metal bellow transfers vibrations, which can be sufficient to degrade the proper functioning of extremely sensitive instruments.

Accordingly, there is a long felt need for an efficient mechanism for isolating vibrations from turbo pumps, and it would be very desirable if such mechanism were to provide a hermetic seal while permitting the pumps to vibrate without passing vibrations to the chamber.

SUMMARY OF THE INVENTION

It is an object of this invention to provide vibration isolation of high vacuum pumps from a vacuum chamber. Since the pump vibrates, it is necessary to connect the pump to the vacuum chamber via a flexible, vacuum-tight material. A fiber-reinforced diaphragm is preferred at present. The elastomer diaphragm enables the pump to move in all six degrees of freedom, while transferring minimum force to the chamber. To minimize the gas permeation through the elastomer diaphragm, an intermediate pumping technique may be used. The mid-section between the diaphragms is connected to the roughing pump, the back up pump for the turbo. The diaphragm may be made out of any flexible, vacuum-tight material, or a very thin metal diaphragm whose ends are sealed by an elastomer.

There is thus provided, is accordance with the present invention, a damper mechanism for isolating vibrations from a turbo pump to a vacuum chamber, the damper mechanism including an elastomeric diaphragm coupled between the pump and the vacuum chamber so as to permit the pump to move in six degrees of freedom, while transferring minimum force to the chamber. Preferably, the elastomeric diaphragm is fiber reinforced.

According to one embodiment of the invention, the damping is provided by three elastomer dampers: an isolation mass is connected between two elastomer dampers. Alternatively, pneumatic integrated isolators may be utilized.

According to a further embodiment, tuned dampers may be added to the elastomer damper. By measuring the tuned damper acceleration amplitude and maximizing it by changing the rotational speed of the pump, minimum transmissibility is achieved. The tuned dampers are tuned to the basic rotational speed of the pump.

BRIEF DESCRIPTION OF THE DRAWINGS

The present invention will be further understood and appreciated from the following detailed description taken in conjunction with the drawings in which:

FIG. 2D is a sectional illustration of a pump with a damper mechanism constructed and operative in accordance with another embodiment of the present invention; and FIG. 2E is a sectional illustration of a pump with a damper mechanism constructed and operative in accordance with a further embodiment of the present invention.

DETAILED DESCRIPTION OF THE INVENTION

The present invention relates to a vibration damper mechanism that connects a vacuum pump, particularly a turbo pump, to a vacuum chamber. The vibration damper mechanism consists of a flexible elastomer diaphragm that connects the pump to the chamber and enables the pump to move in all directions. The elastomer diaphragm provides a vacuum-tight seal.

According to a preferred embodiment, the vibration damper mechanism consists of three or more dampers that carry the vacuum load and pump mass and isolate the pump vibration from the chamber. The dampers can utilize three or more different concepts of damping: the first, an elastomer damper with intermediate mass; the second, an integrated air or pneumatic damper, the third a tuned damper wherein the pump's main speed is tuned to the damper's resonance via a closed loop. These concepts will be described in more detail with reference to the Figures.

Figure 1:
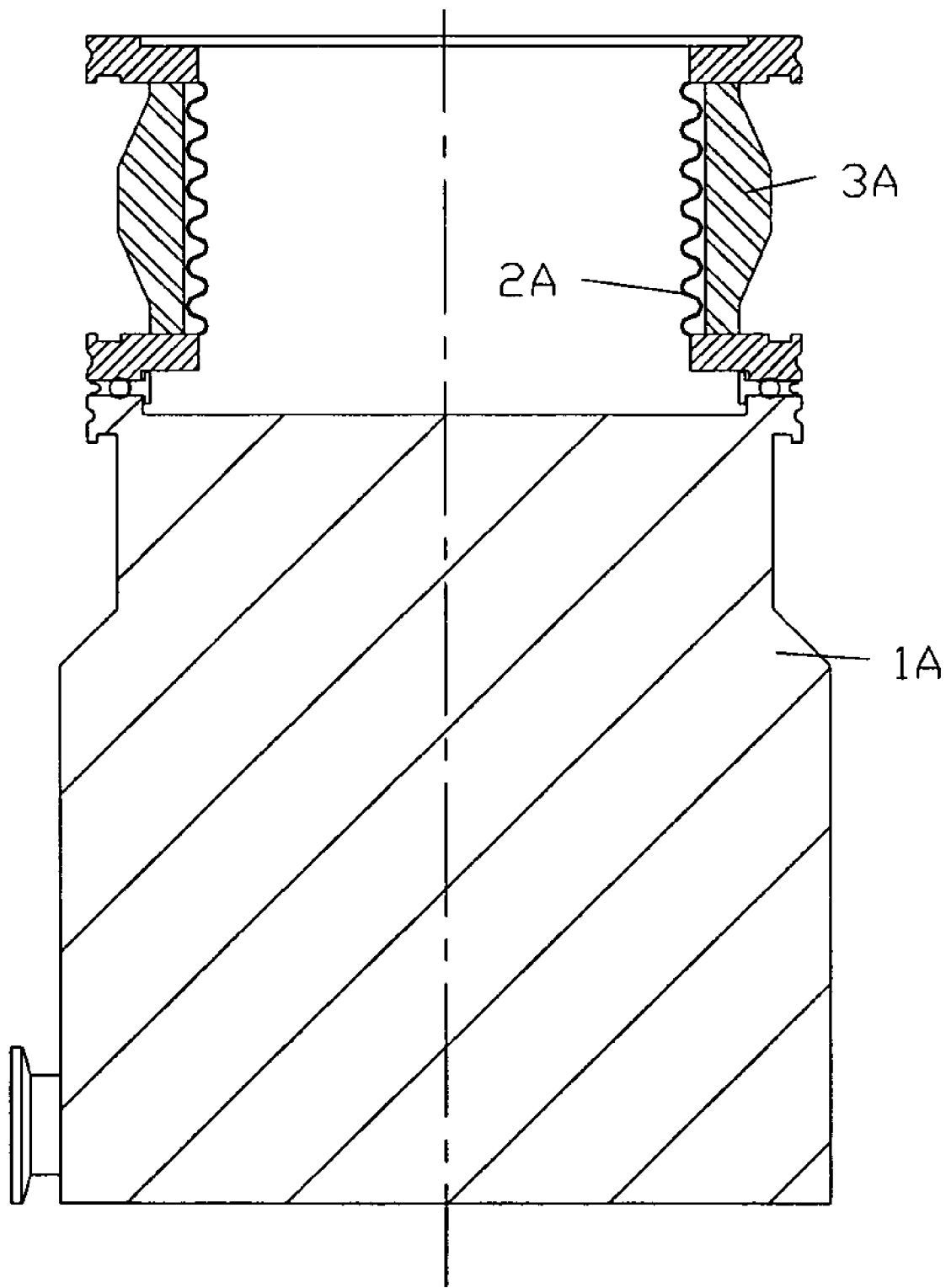
FIG. 1 is a sectional illustration of a pump with a damper mechanism according to the prior art.
Figure 2A:
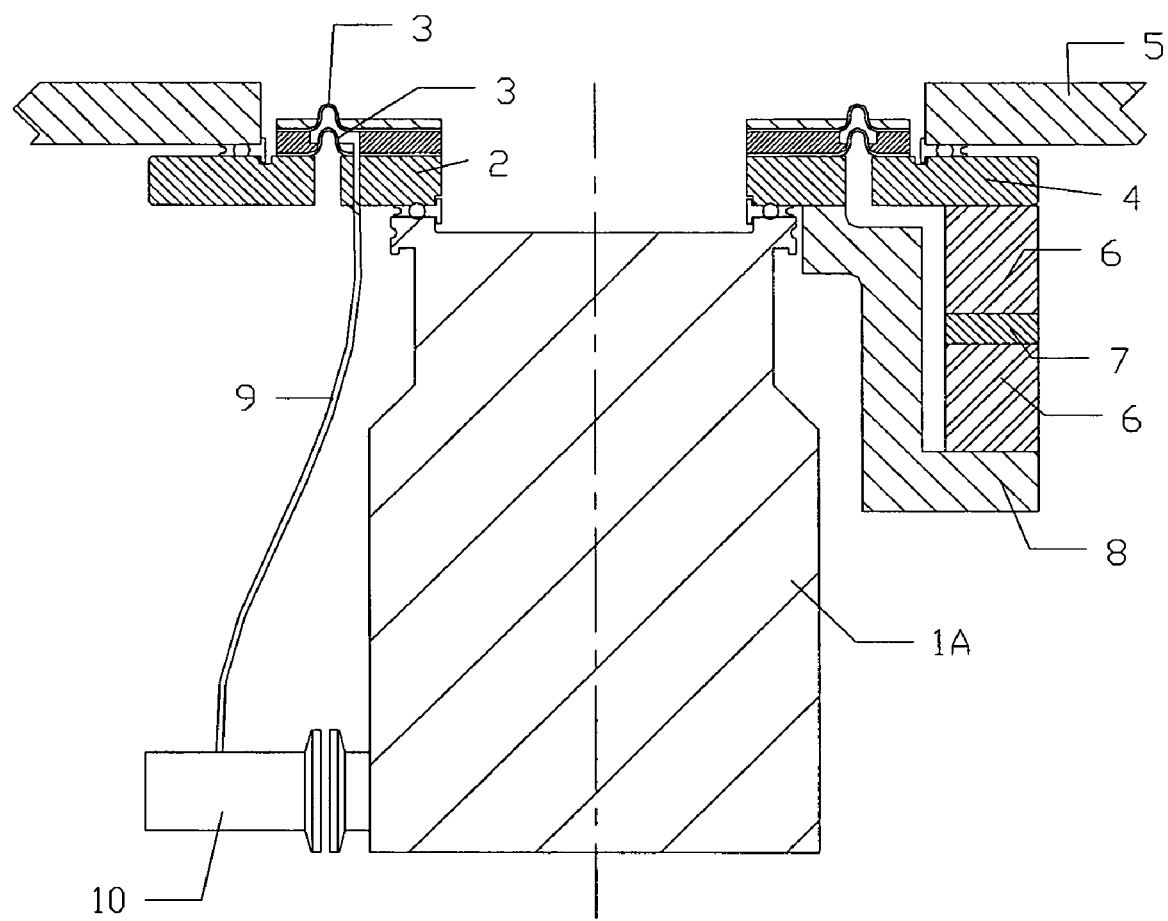
FIG. 2A is a sectional illustration of a pump with a damper mechanism constructed and operative in accordance with one embodiment of the present invention.

Referring to FIG. 2A, there is shown a sectional illustration of a pump (1A) with a damper mechanism constructed and operative in accordance with one embodiment of the present invention. In this embodiment, vacuum pump (1A) is connected to a base (2) via a standard vacuum-tight flange, ISO style or other.

A sandwich of two elastomer diaphragms (3) is built with one side on the base (2). The other side of these diaphragms (3) is connected to a static flange (4), which is coupled to the vacuum chamber. These double diaphragms are vacuum-tight and sealed to base (2) and static flange (4). The static flange (4) is connected to a vacuum chamber (5) via a standard vacuum flange, ISO style or other.

Since gas permeation through the elastomer diaphragms (3) may be large, the space between the two diaphragms is connected via a tube (9) to the outlet of the vacuum pump (10), which is connected to a roughing pump. This serves to reduce the pressure between the diaphragms (3), thereby providing a double seal with an intermediate pump.

According to an alternative embodiment of the invention, illustrated in FIG. 2D, the vacuum sealing may consist of a very thin metal diaphragm (31) whose ends are sealed by an elastomer, shaped, in this example, as two o-rings (32) on each side of the metal diaphragm. One side of the diaphragm 31 is mounted on the base (2) of the pump and the other side is mounted on a static flange (4) coupled to the vacuum chamber. In this way, the metal does not contact the vacuum chamber, and the elastomer serves to absorb the vibrations. In this option, only one diaphragm is required.

Since the atmospheric pressure tends to pull the vacuum pump into the vacuum chamber, it is essential to connect additional dampers between the vacuum pump and the vacuum chamber. In the embodiment of FIG. 2A, three additional dampers are provided. These dampers consist of two conventional elastomer dampers (6) with a damping mass (7) connected between the two elastomer dampers (6). A post (8), connected to the pump, supports the dampers.

Figure 2B:
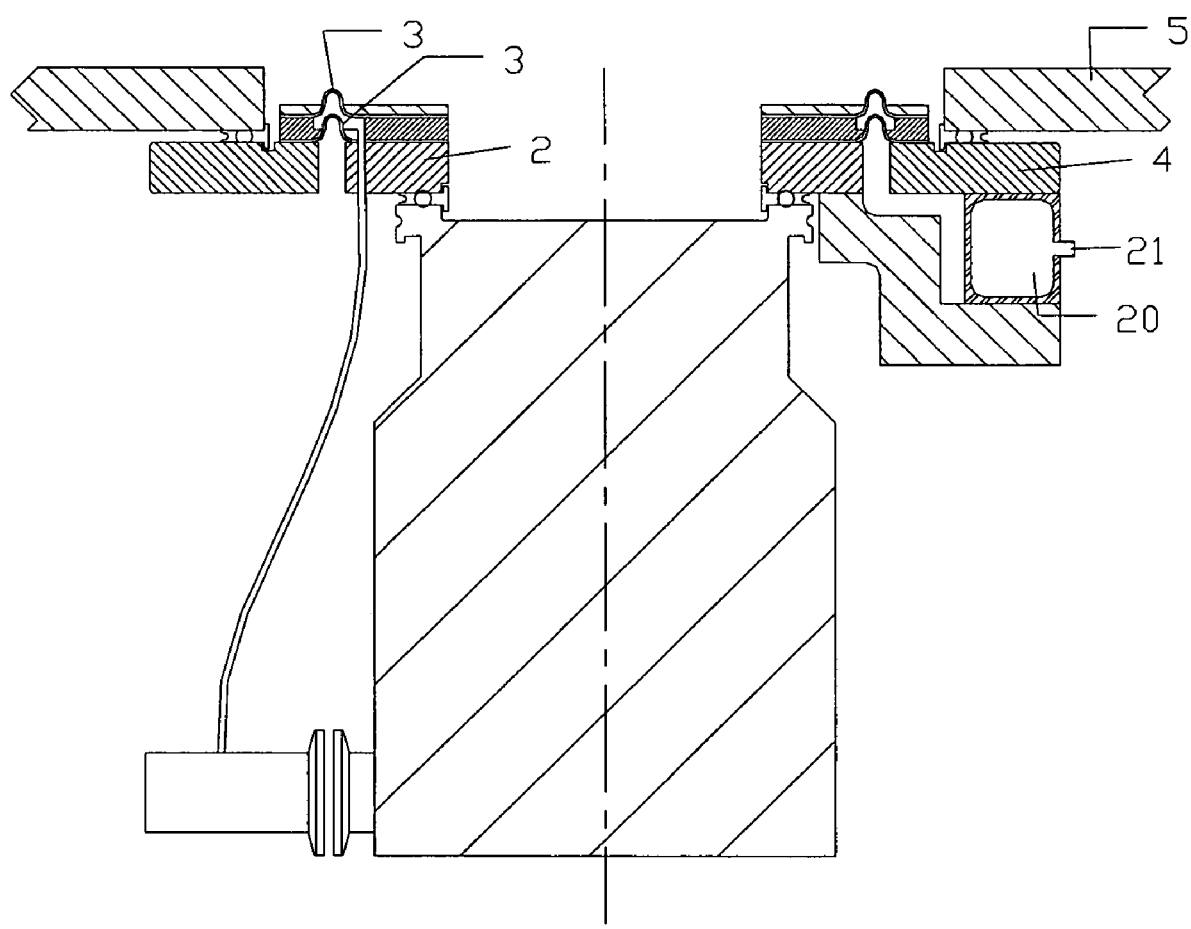
FIG. 2B is a sectional illustration of a pump with a damper mechanism constructed and operative in accordance with another embodiment of the present invention.

Another way to achieve damping is shown in FIG. 2B, a sectional illustration of a pump (1A) with a damper mechanism constructed and operative in accordance with another embodiment of the present invention. Pump (1A) is connected to the vacuum chamber (5) via a double elastomer seal (3), substantially as shown and described in FIG. 2A, and via a pneumatic vibration isolator (20) mounted between a static flange (4) coupled to the vacuum chamber and a post. The pneumatic damper (20) is connected to a pressurized air supply (21).

Another way to achieve a pneumatic vibration damper is shown in FIG. 2E. In this embodiment, the base (2) is connected to the static flange (4) by a flexible diaphragm (43), thus creating an annular volume (44). Pressurizing this volume (44) from a source of pressurized air (41) serves to create the force needed to overcome the vacuum forces, thus achieving a pneumatic vibration isolator.

Figure 2C:
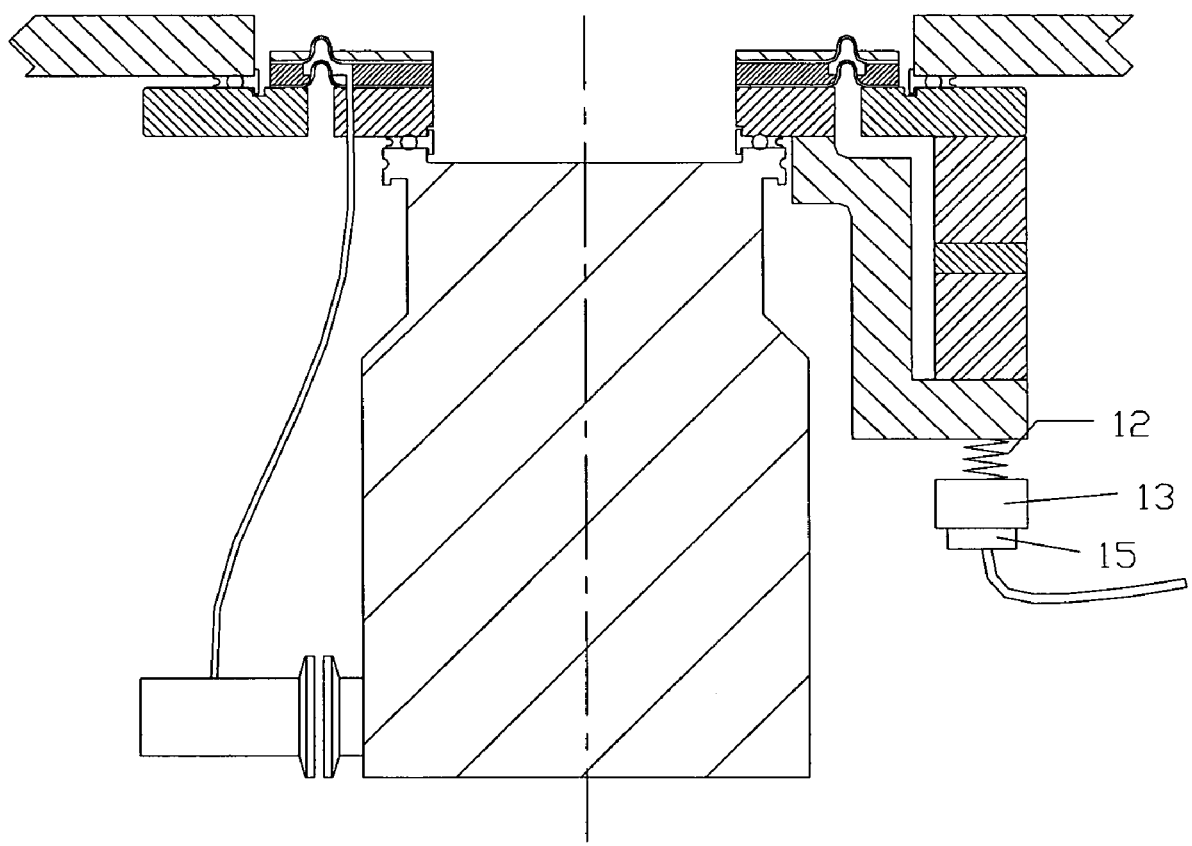
FIG. 2C is a sectional illustration of a pump with a damper mechanism constructed and operative in accordance with a further embodiment of the present invention.

Still another way to achieve additional vibration isolation is shown in FIG. 2C, a sectional illustration of a pump (1A) with a damper mechanism constructed and operative in accordance with a further embodiment of the present invention. In this embodiment, a tuned damper is connected to the base of existing dampers. This embodiment can apply to the embodiment with elastomer dampers as well as to the embodiment having a pneumatic damper.

The tuned damper consists of a spring (12) and a mass (13). The resonance frequency of the mass-spring system is roughly tuned to the pump main speed frequency. It is a particular feature of the present invention that this exact tuning is accomplished, not by adjusting the frequency of the tuned damper, as in conventional systems, but by adjusting the rotational speed of the pump to the frequency of the tuned damper. Thus, an accelerometer (15) is coupled to the mass of the tuned damper and the acceleration of the mass measured. Changing the rotational speed of the pump maximizes the acceleration measured by this accelerometer. When maximum acceleration of the mass is achieved, the rotational speed of the pump is exactly at the tuned mass frequency, which is optimal. It will be appreciated that the tuned damper frequency is designed to be at the desired rotational speed of the pump.

It is a particular feature of the present invention that the damper mechanism is a horizontal system, not vertical as in conventional systems. Thus, the pump is closer to the chamber and the damper can be very short. In this way, the pumping speed that is achieved in the chamber is very similar to the basic pumping speed of the pump.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims, which follow.

The invention claimed is:

1. A vibration isolator for isolating vibrations from a vacuum pump constructed and adapted for coupling to a vacuum chamber, the vibration isolator comprising:
   a sealing mechanism including an elastomeric material forming a resilient seal between the pump and the vacuum chamber, permitting the pump to move in six degrees of freedom, while transferring minimum force to the chamber;
   said sealing mechanism including two elastomer diaphragms sealingly mounted as a sandwich between the pump and the vacuum chamber,
   said sealing mechanism further comprising intermediate pumping means for providing vacuum between said diaphragms; and
   a damping mechanism, for damping vibrations, for mounting between the pump and the vacuum chamber.

2. The vibration isolator according to claim 1, wherein said elastomeric material is fiber reinforced.

3. The vibration isolator according to claim 1, wherein one side of said sandwich is sealed to a base coupled to the pump, and another side of said sandwich is sealed to a static flange coupled to the vacuum chamber.

4. The vibration isolator according to claim 1, wherein said damping mechanism includes two elastomer damper elements with a damping mass connected between them coupled to said vacuum chamber.

5. The vibration isolator according to claim 1, wherein said damping mechanism includes an integrated pneumatic damper mounted between said pump and said vacuum chamber.

6. The vibration isolator according to claim 1, wherein said damping mechanism includes a tuned damper, whose acceleration is maximized by adjusting rotational speed of the pump, mounted between said pump and said vacuum chamber.

7. The vibration isolator according to claim 1, wherein said damping mechanism includes a flexible diaphragm coupled between the pump and the vacuum chamber, so as to create a pressurizable annular volume.

8. A method for isolating vibrations from a vacuum pump coupled to a vacuum chamber, the method comprising:
   coupling a sealing mechanism including an elastomeric material to form a resilient seal between the pump and the vacuum chamber, permitting the pump to move in six degrees of freedom, while transferring minimum force to the chamber;
   said coupling including:
      coupling two elastomer diaphragms as a sandwich between the pump and the vacuum chamber, and
      providing intermediate pumping means for creating vacuum between said diaphragms; and
   mounting a damper for damping vibrations between the pump and the vacuum chamber.

9. The method according to claim 8, wherein the step of coupling includes:
   sealing one side of said sandwich to a base coupled to the pump; and
   sealing another side of said sandwich to a static flange coupled to the vacuum chamber.

10. The method according to claim 8, wherein said mounting includes:

mounting two elastomer damper elements with a damping mass connected between them to said vacuum chamber.

11. The method according to claim 8, wherein said mounting includes:

mounting an integrated pneumatic damper between said pump and said vacuum chamber.

* * * * *